(12) United States Patent
Yang et al.

(10) Patent No.: US 9,185,045 B1
(45) Date of Patent: Nov. 10, 2015

(54) TRANSPORT PROTOCOL FOR INTERACTIVE REAL-TIME MEDIA

(71) Applicant: Ubitus Inc., Grand Cayman (KY)

(72) Inventors: Tsung-Wen Yang, Taipei (TW); Chung-Chou Yeh, Taipei (TW); An-Lun Teng, Taipei (TW)

(73) Assignee: Ubitus, Inc. (KY)

( * ) Notice: Subject to any disclaimer, the term of this patent is extended or adjusted under 35 U.S.C. 154(b) by 0 days.

(21) Appl. No.: 14/702,353

(22) Filed: May 1, 2015

(51) Int. Cl.
| H04L 12/28 | (2006.01) |
| H04L 12/841 | (2013.01) |
| H04W 28/02 | (2009.01) |
| H04W 28/12 | (2009.01) |
| H04L 12/801 | (2013.01) |
| H04L 12/26 | (2006.01) |
| H04L 1/08 | (2006.01) |
| H04L 1/16 | (2006.01) |
| H04J 1/16 | (2006.01) |

(52) U.S. Cl.
CPC ................ *H04L 47/283* (2013.01); *H04L 1/08* (2013.01); *H04L 1/1678* (2013.01); *H04L 43/0835* (2013.01); *H04L 43/0864* (2013.01); *H04L 47/11* (2013.01); *H04W 28/0289* (2013.01); *H04W 28/12* (2013.01)

(58) Field of Classification Search
USPC .................... 370/235, 278, 412, 253
See application file for complete search history.

(56) References Cited

U.S. PATENT DOCUMENTS

| 6,104,757 | A | 8/2000 | Rhee | |
| 6,438,603 | B1 | 8/2002 | Ogus | |
| 7,304,951 | B2 | 12/2007 | Rhee | |
| 2010/0020689 | A1 * | 1/2010 | Tang | 370/235 |
| 2010/0046370 | A1 * | 2/2010 | Ghose et al. | 370/235 |
| 2013/0250853 | A1 * | 9/2013 | Eravelli et al. | 370/328 |

* cited by examiner

*Primary Examiner* — John Pezzlo
(74) *Attorney, Agent, or Firm* — Mauriel Kapouytian Woods LLP; Lawrence Gabuzda

(57) ABSTRACT

Methods, apparatuses, and computer program products for transporting data from a sender to a receiver with low delay for interactive real-time media applications are described.

18 Claims, 12 Drawing Sheets

Data packet 410

| IP Header 401 | UDP Header 402 | Packet Sequence 411 | Chunk Sequence 412 | Message Sequence 413 | Drop message sequence 414 | NACK Sequence 415 |

| RTT 416 | Timestamp 417 | TTL 418 |

ACK packet 420

| IP Header 401 | UDP Header 402 | Echo Sequence 421 | Cumulative ACK 422 | Congestion event rate 423 | Receive Rate 424 |

NACK packet 430

| IP Header 401 | UDP Header 402 | NACK Sequence 431 | Loss block 1 432 | Loss block 2 433 | Loss block N 434 |

FIG. 4

TRANSPORT PROTOCOL FOR INTERACTIVE REAL-TIME MEDIA

BACKGROUND

Networked applications rely on transport layer protocols to deliver data across the network. Different types of applications place different requirements on the transport layer. Delay is an issue that presents a challenge in the context of network communications.

End to end delay has several components. Some of these delay components are introduced by elements of a sender, such as a send buffer and congestion control elements. Other delay components are introduced by elements of a receiver such as a receive buffer. Still other delays are introduced by network path elements such as network path buffers and by physical propagation along network links. More particularly, end to end delay can include: 1) Queueing delay in a send buffer, which is the time that data stays in a send buffer until sending starts. This delay occurs when the rate of sending data is lower than the data rate. A large send buffer introduces large queueing delay. 2) Sending delay, which is the time that it takes for data to be sent. This delay can be influenced by the operation of congestion control elements at the sender, which under some conditions acts to reduce the sending rate in order to relieve congestion. 3) Propagation delay, which is the time it takes for a packet to get across the network path under no congestion (including delay due to the finite speed of light in transmission media). 4) Queueing delay in network buffers. This delay occurs when the offered traffic exceeds the network capacity. 5) Retransmission delay, which is the time that it takes for lost packets to be recovered. 6) Head-of-line (HOL) blocking delay, which is introduced by the requirement of in-order delivery and is the time that new data is blocked by old data.

The delay components are determined by two modules in transport protocols. The first is congestion control, which regulates the rate at which data is sent into the network. Congestion control affects the queueing delay in the send buffer, the sending delay, and queueing delay in the network. The second is error control, which provides reliability. Error control affects the retransmission delay and head-of-line blocking delay.

User Datagram Protocol (UDP) and Transmission Control Protocol (TCP) are standard transport protocols in wide use in the Internet. UDP does not provide congestion control. Data is sent immediately. TCP is the most widely used transport protocol. It provides congestion control that responds to the change of available bandwidth. TCP also provides reliability (recovery of lost packets).

SUMMARY

Both User Datagram Protocol and Transmission Control Protocol have limitations with respect to delivery of interactive real time media. Since UDP does not reduce the sending rate to respond to congestion, it may have higher packet losses and introduce high queueing delay in network buffers. High packet losses will degrade video quality. However, TCP is also not well suited for interactive real-time media. TCP aggressively reduces its sending rate in response to even a single instance of congestion, which increases the sending delay and causes video jitter. TCP uses a loss-based congestion control procedure that operates by filling the queues on a path until loss occurs, thus maximizing delay. The reliability of TCP forces every type of data to be received even if some data is less important or too late to be useful. TCP uses a fixed-sized send buffer that prevents applications from quickly reacting to reduced available bandwidth. Using a small send buffer can limit the delay, but this hurts throughput.

Interactive real-time multimedia applications require low delay and a smooth sending rate. Such applications require an intermediate level of reliability that may be called "partial reliability." What is needed is a transport protocol that supports the requirements of real-time interactive media, including lower delay in the network, lower delay in the send buffer, a smoother sending rate, and partial reliability.

Embodiments of the present invention provide an application-level transport protocol to support the requirements of real-time interactive media. In a preferred embodiment, techniques are provided for congestion control, dynamic management of send buffers, message dropping, and error control.

The preferred congestion control technique is delay-based, in contrast to the loss-based congestion control of TCP. The delay-based technique provides a smoother sending rate and lower queueing delay in network buffers.

Queueing delay in the send buffer is controlled by calculating the current send buffer queueing delay at the time a new message is requested to be sent and comparing the current queueing delay to the threshold. If the delay exceeds the threshold, the new message is not placed in the send buffer.

Message dropping procedures are provided to ensure that messages that are "too old" are dropped and thus do not contribute to queueing delays. Special procedures are provided for video to reduce the occurrence of "artifacts" when a video frame is dropped by sending an "out of band" request to a video encoder to send a new video key frame.

The preferred error control technique utilizes only gap-based loss detection in the receiver, in contrast to TCP and UDP which perform both gap-based loss detection at the receiver as well as timer-based detection at the sender. This approach is well-matched to the regular data generation and high packet rates characteristic of real-time media applications, conditions under which it is found that gap-based detection tends to perform particularly well. It also avoids problems with timer-based approaches that can be caused by inaccurate Round Trip Time (RTT) estimates.

BRIEF DESCRIPTION OF THE DRAWINGS

FIG. 4 illustrates packet structures for congestion control and error control according to an embodiment of the present invention.

DETAILED DESCRIPTION

Embodiments of the present invention provide a transport protocol for interactive real-time media.

Figure 1:
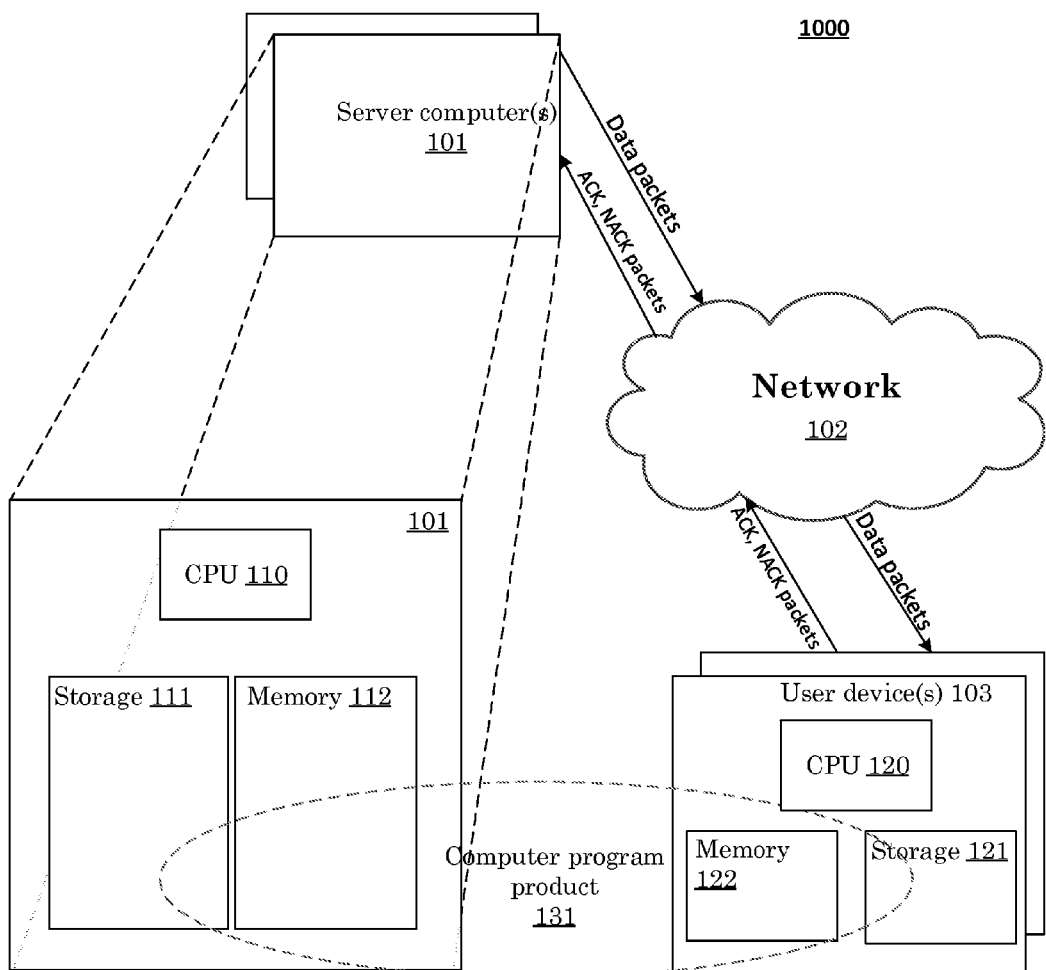
FIG. 1 is a block diagram of a distributed client-server computer system supporting interactive real-time multimedia applications according to one embodiment of the present invention.

FIG. 1 is a block diagram of a distributed client-server computer system 1000 supporting interactive real-time multimedia applications according to one embodiment of the present invention. Computer system 1000 includes one or more server computers 101 and one or more user devices 103 configured by a computer program product 131. Computer program product 131 may be provided in a transitory or non-transitory computer readable medium; however, in a particular embodiment, it is provided in a non-transitory computer readable medium, e.g., persistent (i.e., non-volatile) storage, volatile memory (e.g., random access memory), or various other well-known non-transitory computer readable mediums.

User device 103 includes central processing unit (CPU) 120, memory 122 and storage 121. User device 103 also includes an input and output (I/O) subsystem (not separately shown in the drawing) (including e.g., a display or a touch enabled display, keyboard, d-pad, a trackball, touchpad, joystick, microphone, and/or other user interface devices and associated controller circuitry and/or software). User device 103 may include any type of electronic device capable of providing media content. Some examples include desktop computers and portable electronic devices such as mobile phones, smartphones, multi-media players, e-readers, tablet/touchpad, notebook, or laptop PCs, smart televisions, smart watches, head mounted displays, and other communication devices.

Server computer 101 includes central processing unit CPU 110, storage 111 and memory 112 (and may include an I/O subsystem not separately shown). Server computer 101 may be any computing device capable of hosting computer product 131 for communicating with one or more client computers such as, for example, user device 103, over a network such as, for example, network 102 (e.g., the Internet). Server computer 101 communicates with one or more client computers via the Internet and may employ protocols such as the Internet protocol suite (TCP/IP), Hypertext Transfer Protocol (HTTP) or HTTPS, instant-messaging protocols, or other protocols.

Memory 112 and 122 may include any known computer memory device. Storage 111 and 121 may include any known computer storage device.

Although not illustrated, memory 112 and 122 and/or storage 111 and 121 may also include any data storage equipment accessible by the server computer 101 and user device 103, respectively, such as any memory that is removable or portable, (e.g., flash memory or external hard disk drives), or any data storage hosted by a third party (e.g., cloud storage), and is not limited thereto.

User device(s) 103 and server computer(s) 101 access and communicate via the network 102. Network 102 includes a wired or wireless connection, including a Wide Area Networks (WANs) and cellular networks or any other type of computer network used for communication between devices.

In the illustrated embodiment, computer program product 131 in fact represents computer program products or computer program product portions configured for execution on, respectively, server 101 and user device 103. A portion of computer program product 131 that is loaded into memory 122 configures device 103 to create and send ACK and NACK packets in response to data packets received from sever 101, the ACK, NACK, and data packets being in conformance with the inventive protocol requirements further described herein. A portion of computer program product 131 that is loaded into memory 112 configures server 101 to utilize information received in ACK and NACK data packets for efficiently controlling the queuing and sending of data packets in conformance with the inventive protocol requirements further described herein.

Figure 2:
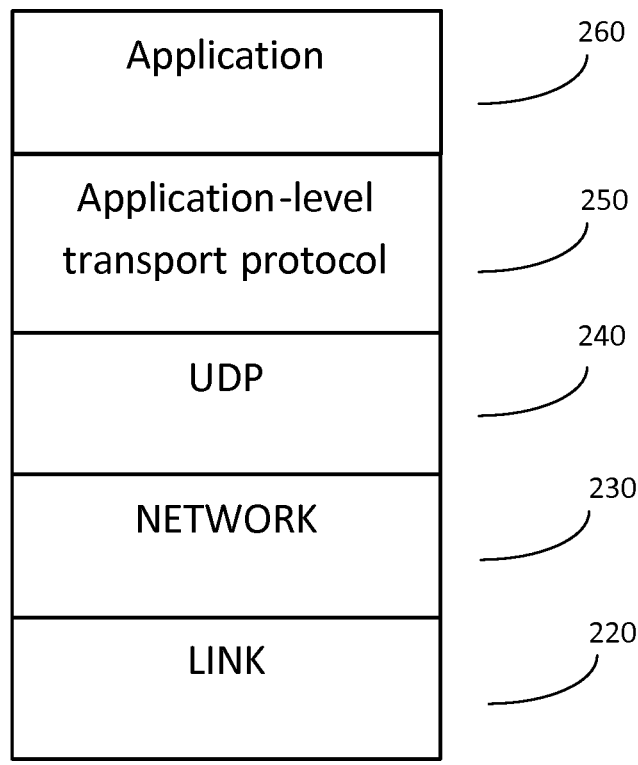
FIG. 2 is a protocol layering diagram showing the relationships between an application-level transport protocol and other protocol layers, according to an embodiment of the present invention.

FIG. 2 illustrates that an embodiment of the present invention provides an application-level transport protocol to support the requirements of interactive real-time multimedia. Conventionally, in the Internet and networks employing the standard Internet suite of protocols, the transport layer resides above the network layer (IP layer) and below the application layer. Services provided by transport layer protocols include congestion control, reliability (error control), and ordered delivery. Standard transport layer protocols in use in the Internet include Transmission Control Protocol (TCP) and User Datagram Protocol (UDP). As discussed, interactive real-time multimedia applications have requirements that are not well satisfied by either TCP or UDP alone.

A preferred embodiment of the present invention provides a UDP-based application level transport protocol for interactive real-time media. As shown in FIG. 2, in such embodiments, the interactive real-time media transport protocol is implemented at the application layer of the Internet stack, and utilizes the services of an underlying standard UDP protocol at the transport layer. An advantage of such embodiments is that they can rely on the standard UDP protocol for basic transport layer services, and focus in the application-level transport protocol on providing services especially tailored to the needs of interactive real-time media.

In other embodiments, the interactive real-time media transport protocol can be implemented as a monolithic layer 3 transport protocol. In such embodiments, the interactive real-time media transport protocol provides basic transport layer services (such as those provided conventionally by UDP) in addition to specialized services tailored to the needs of interactive real-time media. Advantages of such embodiments can include greater efficiency and reduced processing time.

Figure 3:
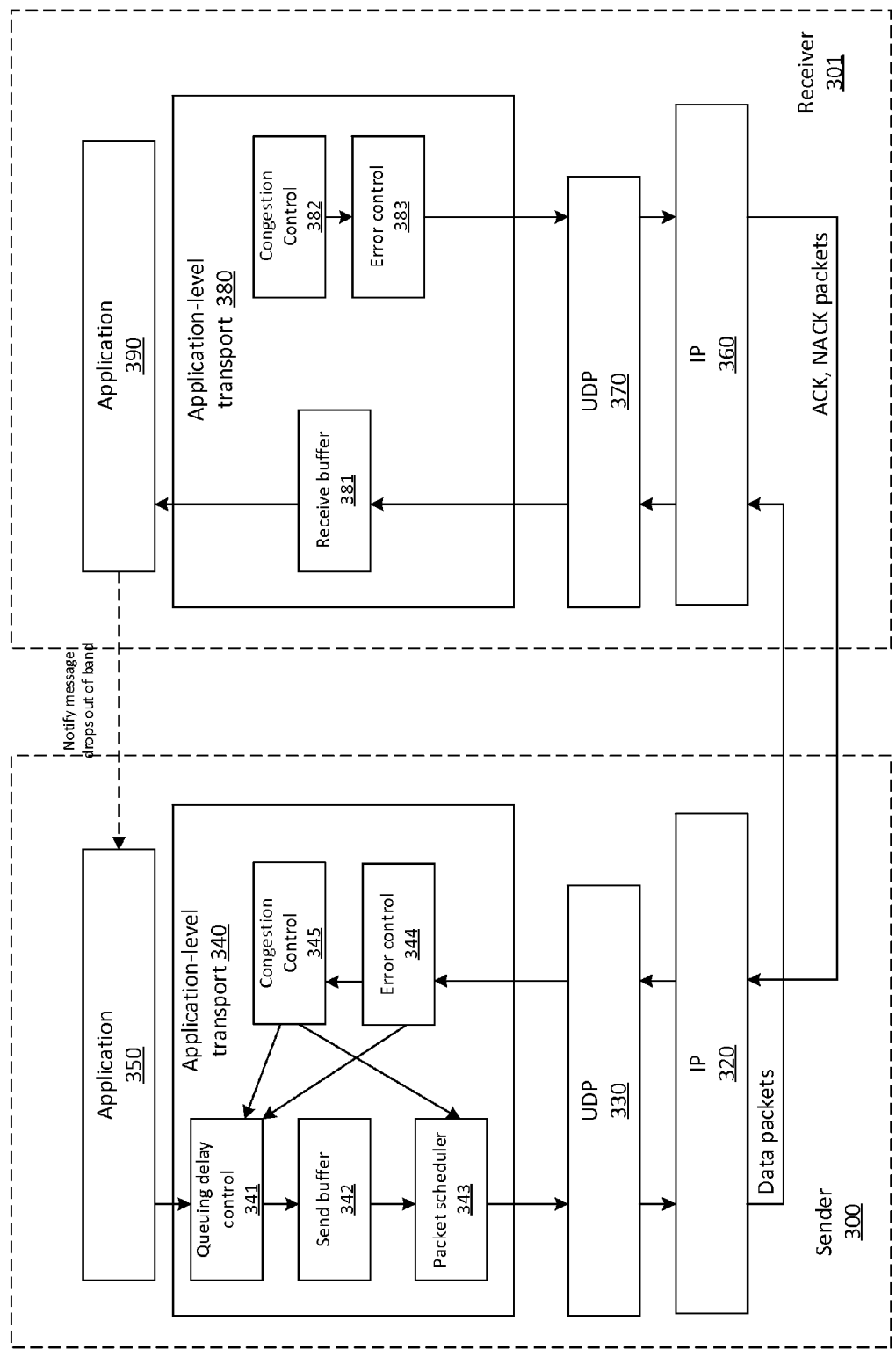
FIG. 3 is a high-level block diagram of sender and receiver devices configured to implement an application-level transport protocol according to an embodiment of the present invention.

FIG. 3 is a high-level block diagram of sender and receiver devices configured to implement an interactive real-time media transport protocol according to embodiments of the present invention. As suggested by the depiction of FIG. 3, the interactive real-time media transport protocol comprises two major entities, a sender 300 (sometimes referred to as a transmitter) and a receiver 301. The sender sends data packets over a network to the receiver, which normally (in the absence of errors or packet loss) receives the sent data packets. The receiver sends acknowledgement (ACK) packets to the sender to acknowledge successful receipt of data packets, or sends negative acknowledgement (NACK) packets to the sender to notify the sender of packet losses.

Also shown in FIG. 3 is an "out-of-band" data path from the application on the receiver side to the application on the sender side. This data path can be implemented, for example, as a TCP connection. The out of band data path can be used, for example, to notify the sending application of message drops that have occurred as part of the message dropping procedure (described below).

In some embodiments, sender 300 can be associated with an entity that sends real-time media information, such as video and audio streams. For example, sender 300 can be associated with a server computer, such as server computer 101 as depicted in FIG. 1. For example, server computer 101 can be a game cloud server. Sender 300 can be realized as software running on server computer 101, or as a combination of hardware and software.

In some embodiments, receiver 301 can be associated with an entity that receives real-time media information, such as video and audio streams. For example, receiver 301 can be associated with user device(s) 103, as depicted in FIG. 1. User device 103 can be, for example a PC, smartphone, or smart TV. Receiver 301 can be realized as software running user device 103, or as a combination of hardware and software.

In some embodiments, server computer 101 may comprise both one or more instances of sender 300 and one or more instances of receiver 301. In some embodiments, client device 103 may comprise both one or more instances of sender 300 and one or more instances of receiver 301.

A preferred embodiment of the inventive interactive real-time media transport protocol can be used to send control information from client device 103 to server computer 101 and also to deliver streaming audio and/or video from server computer 101 to client device 103.

The structure of data packets 410, ACK packets 420, and NACK packets 430 is shown in detail in FIG. 4.

A data packet 410 conveys data (not shown) to or from an application. For example, data packet 410 can convey one "chunk" of data, where a "chunk" is part of a message. A message is the minimal data unit that can be handled by an application. It is received either as a whole or not at all. A message can be, for example, a video frame or an audio frame. A message is split into chunks and each chunk is sent over one UDP data packet. All data packets belonging to the same message have the same message sequence number. The congestion control protocol cares only about packet loss, which is used to calculate the allowed sending rate.

Each of data packets 410, ACK packets 420, and NACK packets 430 includes conventional IP header 401 and conventional UDP header 402, as well as additional header information that will now be described.

Packet sequence 411 is the sequence number of data packet 410. Packet sequence number 411 is incremented once per data packet, and is used for loss detection in the congestion control protocol (described below).

Chunk sequence 412 is the sequence number of a chunk. It is incremented by one per chunk. Chunk sequence 412 is used for re-assembly of messages and loss recovery.

Message sequence 413 is the sequence number of the message to which this chunk belongs.

Drop message sequence 414 is used, in the message drop feature, to notify the receiver that messages prior to this sequence should be dropped.

Each retransmitted data packet carries a NACK sequence 415 that corresponds to the sequence number of the associated NACK request. NACK sequence 415 is used for loss detection and recovery of retransmitted data packets.

RTT 416 is an estimate of round-trip time. RTT 416 is used to determine congestion intervals in the congestion control protocol.

Timestamp 417 records the time when this packet was sent. Timestamp 417 is used for the calculation of queueing delay in the congestion control protocol.

TTL 418 is the remaining time that this message should be kept in the receive buffer. It is used by the message dropping feature.

ACK packets 420 are sent from the receiver to the sender, and in embodiments of the present invention are used to provide feedback as part of the congestion control protocol.

Echo sequence 421 is the largest sequence number of data packets received, and is used to calculate round-trip time (RTT) in the congestion control protocol.

Cumulative ACK 422 is a chunk sequence number, and indicates that all chunks prior to this chunk sequence number have been received.

Congestion event rate 423 is calculated by the receiver, and is used in the calculation of the allowed sending rate in the congestion control protocol.

Receive rate 424 is measured by the receiver, and is used in the calculation of the allowed sending rate in the congestion control protocol.

NACK packets 430 are sent by the receiver to request retransmission of lost chunks. A NACK packet can carry one or more NACK requests. Each NACK request has a sequence number and corresponds to one lost chunk.

NACK sequence 431 is the smallest sequence number of the NACK requests in this NACK packet. This sequence number can help detect duplicate NACK requests and losses of retransmitted data packets.

Loss blocks, such as loss block 432, specify a range of a contiguous sequence numbers of chunks.

The use of data packets, ACK packets, and NACK packets in performing various methods comprising embodiments of the present invention will be described in detail below.

As suggested above, embodiments of the interactive real-time media transport protocol of the present invention comprise several methods which are designed to work together and which together serve to reduce end-to-end delay to the low levels required by real-time interactive media.

Specifically, methods are disclosed for congestion control, control of send buffer queueing delay, message dropping in the receiver, and error control. Each of these methods will now be described in turn, with reference to the corresponding drawings.

It should be noted that, while the methods are designed to work together to satisfy the delay requirements of real-time interactive media, in some embodiments the methods can be used individually, or in various combinations, or in combination with other protocols or methods.

Congestion Control.

Figure 5:
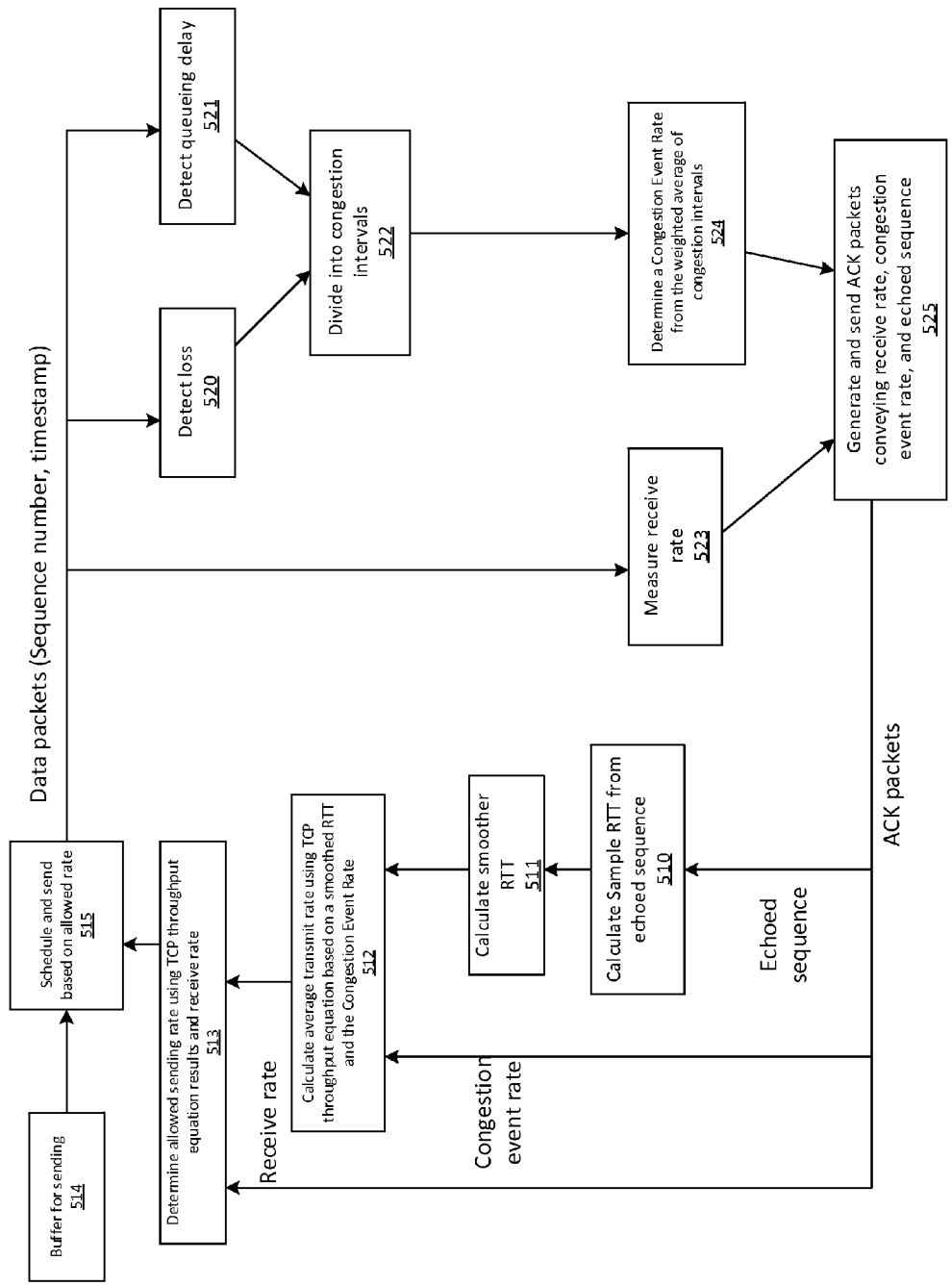
FIG. 5 is a flow diagram of a congestion control procedure according to an embodiment of the present invention.

FIG. 5 depicts a congestion control procedure in accordance with a preferred embodiment of the present invention. In general, the preferred congestion control method is delay-based, in contrast to the loss-based congestion control of TCP. The delay-based method provides a number of advantages, such as a smoother sending rate and lower queueing delay in network buffers.

In FIG. 5, steps at the receiver are generally depicted on the right-hand portion of the diagram, and steps at the sender are generally depicted on the left-hand portion of the diagram. Starting at the top right of the diagram, data packets arrive at the receiver, each including a sequence number and a timestamp. At step 520, loss detection is performed. A break in sequence numbers indicates packet loss. At step 521, the value of the timestamp field is used to measure the relative one-way queueing delay. Packet losses and high, increasing queueing delay are taken as indicative of congestion. At step 522 congestion intervals (periods of time between congestion events) are then defined, and at step 524 a weighted-average congestion interval is calculated. The inverse of the congestion interval is the congestion event rate. At step 525 an ACK packet carrying the congestion event rate, receive rate, and the latest sequence number received is generated and sent back to the sender every RTT (round trip time). The sequence number sent back in the ACK packet is referred to as an "echoed sequence number," and is used to calculate RTT.

The use of a weighted average filter in calculating the weighted-average congestion event rate makes the measured congestion event rate change smoothly, which contributes to a smoother sending rate.

At the sender, the echoed sequence number is then used for the calculation of RTT. At the sender, RTT samples are received at step 510 and, at step 511, a "smoothed" RTT is calculated. At step 512 the "smoothed" RTT and the congestion event rate are used by a TCP throughput equation to calculate the allowed sending rate, which is output at step 513. Also, the current receive rate is monitored. Preferably, the allowed sending rate is limited to no more than twice the receive rate. At step 515 outgoing packets are scheduled and sent based on the allowed sending rate.

In a preferred embodiment, the TCP throughput equation is one specified in RFC 5348 Section 3.1. This equation is:

$$X\_Bps = \frac{s}{R*sqrt(2*b*p/3) + (t\_RTO*(3*sqrt(3*b*p/8)*p*(1+32*p\textasciicircum2)))}$$

Where:

X_Bps is TCP's average transmit rate in bytes per second s is the segment size in bytes (excluding IP and transport protocol headers).

R is the round-trip time in seconds.

p is the loss event rate, between 0 and 1.0, of the number of loss events as a fraction of the number of packets transmitted.

t_RTO is the TCP retransmission timeout value in seconds.

b is the maximum number of packets acknowledged by a single TCP acknowledgement.

In a preferred embodiment, the congestion control method is substantially in conformance with dflow, as described in Internet-Draft draft-ohanlon-rmcat-dflow-02.

Dynamic Send Buffer.

Figure 6:
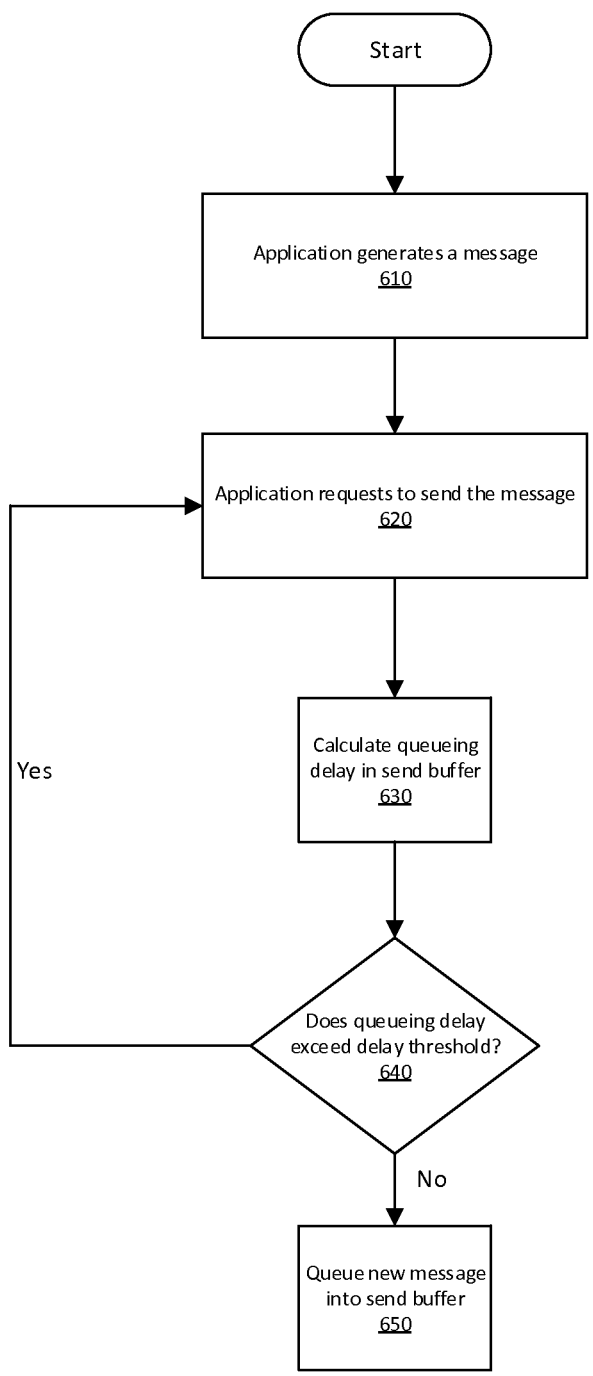
FIG. 6 is a flow diagram showing the control of queueing delay in a dynamic send buffer according to an embodiment of the present invention.

FIG. 6 depicts a method for queueing delay control in the send buffer. This method contributes to the reduction of end-to-end delay by reducing queueing delay in the send buffer.

At step 610 the application generates a message (for example, a video encoder generates a video frame). At step 620 the application requests to send the message. At step 630 the queueing delay in the send buffer is calculated. From the application point of view, this is the time that the new message would need to wait until all pending data are sent. This delay time is equal to pending data size divided by the current sending rate (as set by the congestion control method described above). Pending data includes pending packets not yet sent, and pending retransmissions from NACK requests.

At step 640 the calculated queueing delay is compared to a pre-set threshold. If the delay does not exceed the threshold, at step 650 the new message is queued into the send buffer. If the calculated queueing delay exceeds the threshold, the new message is not appended into the send buffer, and the application has to try again, returning to step 620. In a variation, the application can be explicitly notified of the need to try again Message Dropping.

FIGS. 7 through 10 depict message dropping in the receiver. This method contributes to the reduction of end-to-end delay by reducing the amount of time that new data can be blocked by old data. The method allows applications to specify a time limit on the time that a message should be allowed to try transmitting or retransmitting.

Two mechanisms are used for the receiver to detect messages that are not received within a specified time limit. The first mechanism is a message drop sequence field in each data packet that notifies the receiver to drop all messages prior to that sequence. See also the data packet field layout in FIG. 4. Messages that are not acknowledged with an ACK within a specified time limit are then removed from the send buffer, and the message drop sequence number in a new data packet is updated. Retransmission requests for removed messages are ignored. The second mechanism is a time limit field in each data packet ("time-to-live" or "TTL" field—see FIG. 4) that allows the receiver to determine how long the messages should stay in the receive buffer. Messages that have exceeded the specified time limit are removed from the receive buffer (dropped).

For interactive real-time media applications, time limits for video frames in particular can be specified. For delta frames, the time limit may be frame-rate based. In this alternative, the frame has a time limit of A*1000/frames per second where A is a constant parameter. Alternatively, the limit may be based on a frame interval. Here, the time limit for the i-th frame is B*(t(i)−T(I−1), where t(i) is the time that the i-th frame is sent and B is a constant parameter. For key frames (intra frames) a higher limit should be specified. For video frames, frame drop can introduce a video artifact, which will last until the next key frame is received. When the time between key frames is large, this can cause a bad user experience. To correct this, a notification can be sent out-of-band to the encoder to request a key frame and thus stop the video artifact.

In general, notifications regarding dropped messages can be sent to an application out-of-band by using, for example, a TCP connection.

Figure 7:
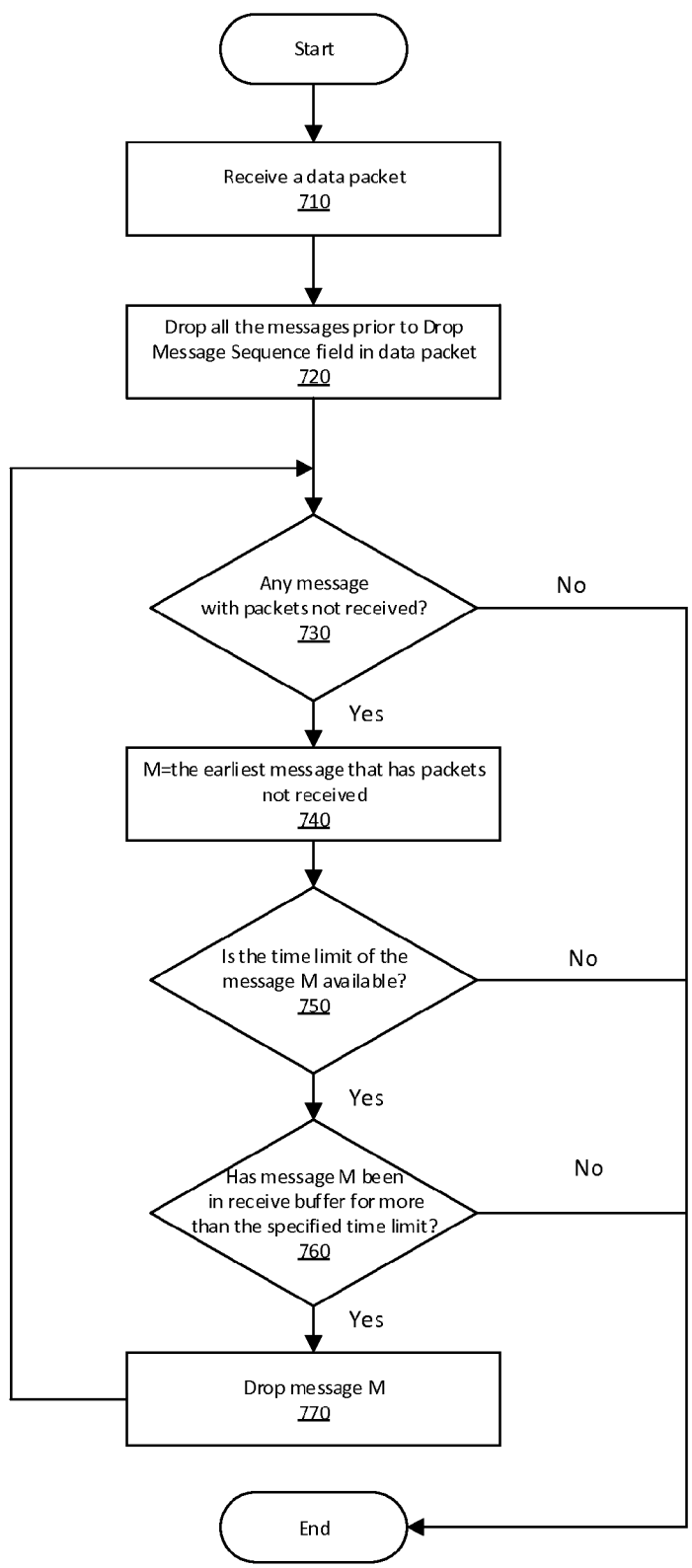
FIG. 7 is a flow chart depicting the operation of message drop at a receiver, according to an embodiment of the present invention.

Next, the message dropping method will be described in more detail with reference to FIG. 7. At step 710 a data packet is received at the receiver, the data packet having a sequence number value in the Drop Message Sequence field. At step 720 all messages in the receive buffer prior to the Drop Message Sequence number are dropped. At step 730, if there are no messages with packets not received the process terminates. If there is at least one message with packets not received, at step 740 the earliest message (M) that has packets not received is identified. At step 750 if the time limit of message M is not available the process terminates. If the time limit of message M is available, control passes to step 760. At step 760 if message M has not been in the receive buffer for more than the specified time limit, the process terminates. If message M has been in the receive buffer for more than the specified time limit, then, at step 770, message M is dropped. In a variation (not shown) the application is then explicitly notified of the message drop by an out-of-band notification.

Figure 8:
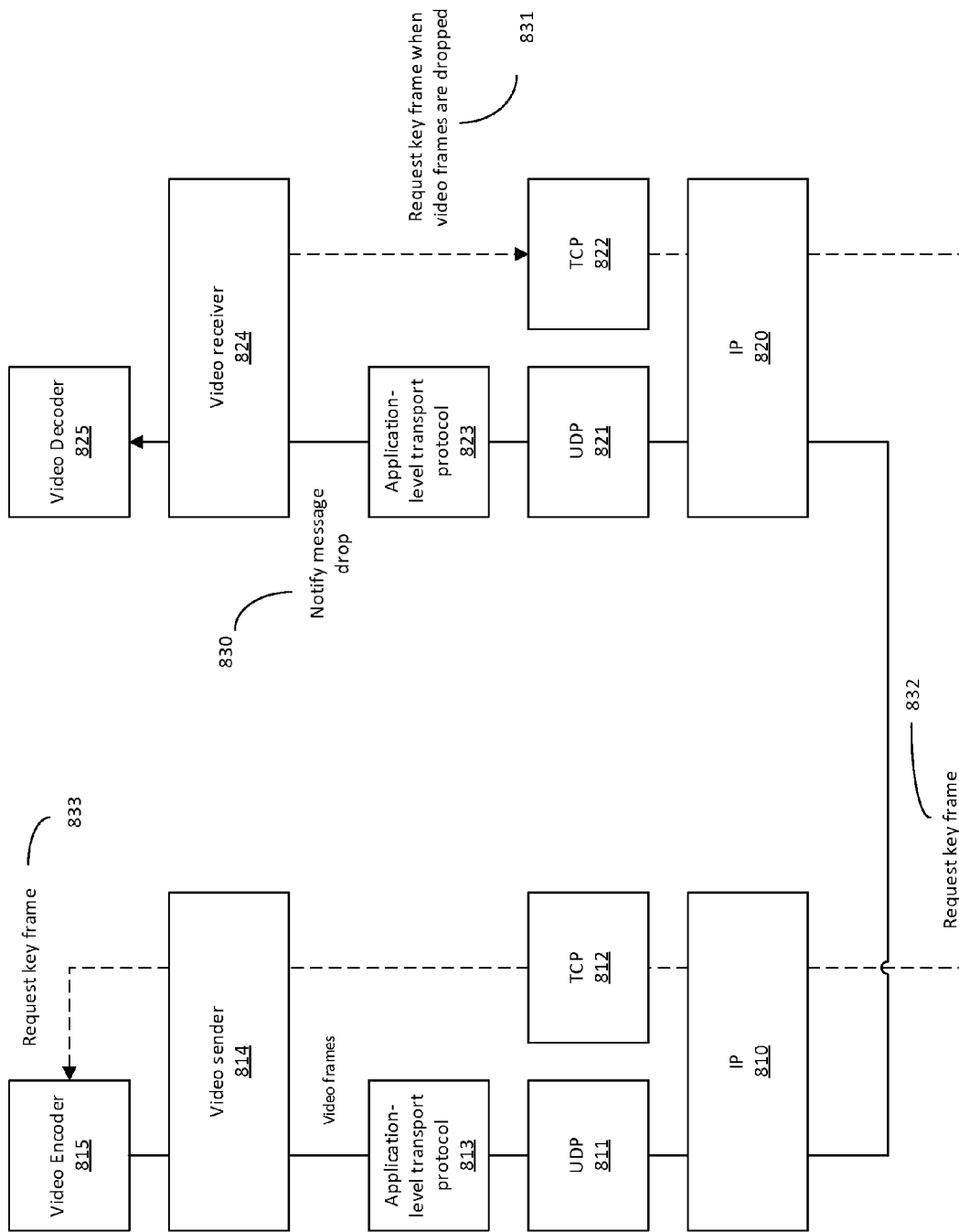
FIG. 8 is a high-level block diagram of sender and receiver devices configured to implement a key frame request procedure in accordance with an embodiment of the present invention.

FIG. 8 is a high-level block diagram of sender and receiver devices configured to implement a key frame request procedure in accordance with an embodiment of the present invention. As shown in FIG. 8, receiver-side application transport protocol module 823 is configured to notify video receiver 824 of a message drop event. In some embodiments, video receiver 824 is then configured to request video encoder 815 to send a new video frame, such as a key frame. The request for a video frame (such as a key frame) can be sent, in some embodiments, via a TCP connection maintained between sender-side TCP entity 812 and receiver-side TCP entity 822. This key frame request procedure can be useful in stopping artifacts caused by dropped messages (video frames).

Figure 9:
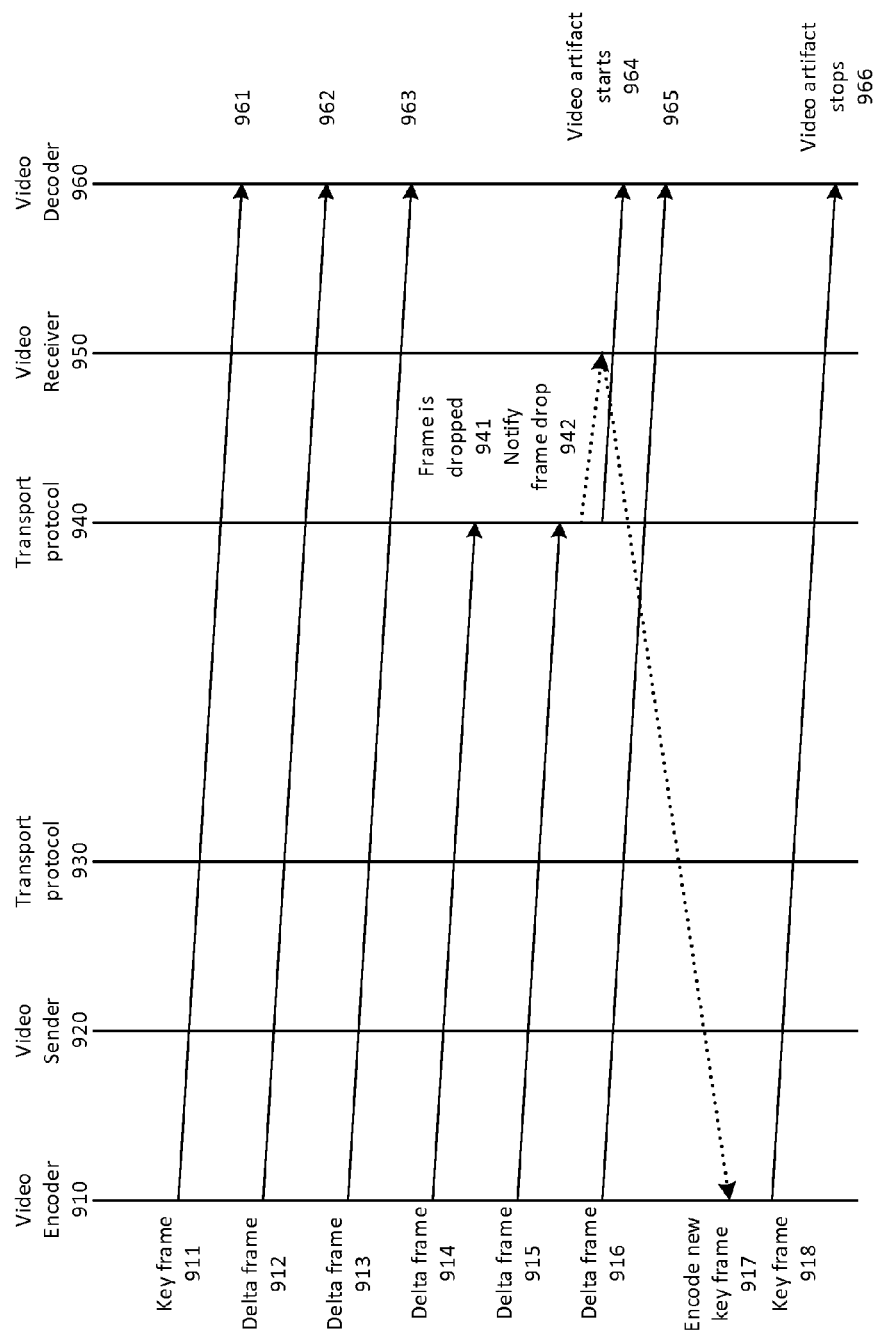
FIG. 9 is a sequence diagram of a key frame request for dropped video frames according to an embodiment of the present invention.

FIG. 9 is a sequence diagram of a key frame request for dropped video frames according to an embodiment of the present invention.

At step 911 of FIG. 9, video encoder 910 encodes a video key frame for transmission via video sender 920. The key frame is then sent across a network by utilizing the services of sender-side transport protocol entity 930 and receiver-side transport protocol entity 940. The key frame is then received by video receiver 950 and handed to video decoder 960, where it is decoded at step 961 for display on, for example, a TV, mobile device, or game console. Next, at step 912, a delta frame (encoding differences in the image since the encoding of the previous key frame) is similarly encoded and sent. A second delta frame is encoded and sent at step 913. However, the next delta frame, sent at step 914, is dropped at step 941 by transport protocol entity 940 at the receiver side. At step 942 transport protocol entity 940 notifies video receiver 950 of the frame drop. Meanwhile, at step 964 a video artifact starts at the receiver. At step 917 video encoder 910, upon request of video receiver 950 (request is indicated by dotted arrow in reverse direction) encodes a new key frame. At step 918 the new key frame is sent, and is received at video decoder 960 at step 966, thereby stopping the video artifact.

Figure 10:
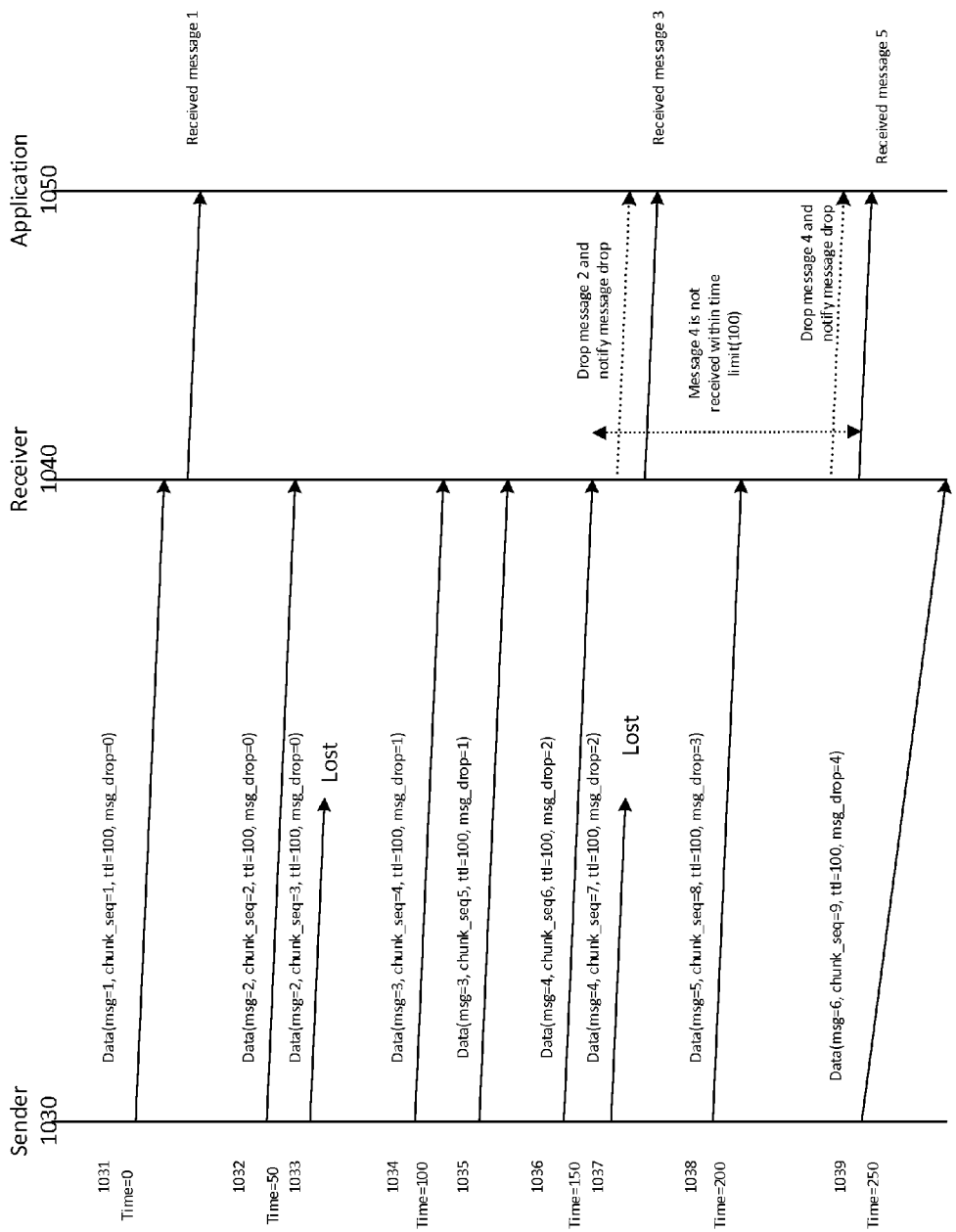
FIG. 10 is a sequence diagram of a message drop mechanism according to an embodiment of the present invention.

Next, an example of message dropping will be described in detail with reference to the sequence diagram of FIG. 10.

At step 1031 sender 1030 sends message 1 comprising one chunk to receiver 1140, which forwards the message to application 1050.

At step 1032 sender 1030 sends a first chunk of message 2 to receiver 1040 where it is held in the receive buffer.

At step 1033 sender 1030 sends a second chunk of message 2, but this chunk is lost.

At step 1034 sender 1030 sends a first chunk of message 3. This data packet includes a message drop field with a value of 1, indicating that any packets of any message with an earlier message drop field being held in the receive buffer should be dropped.

Meanwhile, at step 1035 the second chunk of message 3 is successfully sent and received, and message 3 is forwarded to the application.

At step 1036 a first chunk of message 4 is successfully sent and received. This data packet includes a message drop field with a value of 2, indicating that message 2 should not be held in the receive buffer and should be dropped. The TTL timer for message 4 is started and will expire after 100 ms.

At step 1037 a second chunk of message 4 is sent but it is lost. Message 4 had a TTL field value of 100 time units. When this time expires, message 4 is dropped from the receive buffer and a notification is sent to the application.

At step 1038 message 5 comprising one chunk is successfully sent and received. Message 5 is held awaiting message 4 and is not immediately available to the application. The TTL timer for message 4 expires since the message is still not received. Message 4 is then dropped and a notification is sent to the application. Message 5 is then available to the application.

At step 1039 a chunk of message 6 is sent and received. This message has message drop set to the value 4, but there is nothing with an earlier message sequence number in the buffer, so there is nothing to drop.

Error Control.

The error control method (loss recovery protocol) is based on gap-based loss detection at the receiver. See FIGS. 11 and 12. When losses are detected (due to sequence number breaks), a NACK packet is sent to request the sender to retransmit the lost packets. A NACK packet carries the range of sequence numbers of the lost packets and a sequence number for this NACK request, which increments by one for each lost packet in this NACK. When the sender receives the NACK, it checks whether it is a duplicate request and then retransmits the lost data packet. Each retransmitted data packet carries a NACK sequence number which increments by one for each retransmitted packet. The receiver can check the gap of NACK sequence numbers in the data packet to detect the loss of retransmitted packets. If retransmitted packets are lost again, a new NACK request with a new NACK sequence number is sent.

Figure 11:
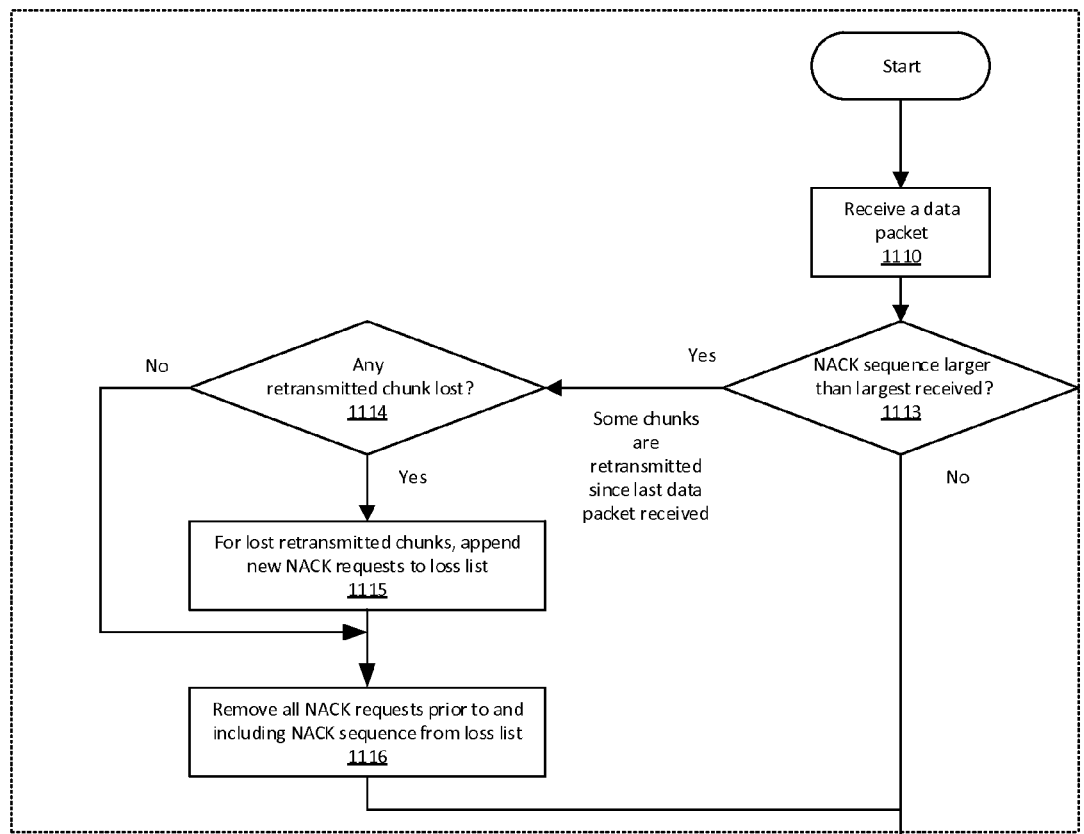
FIG. 11 is a flow chart of loss recovery in the receiver according to an embodiment of the present invention.
Figure 11:
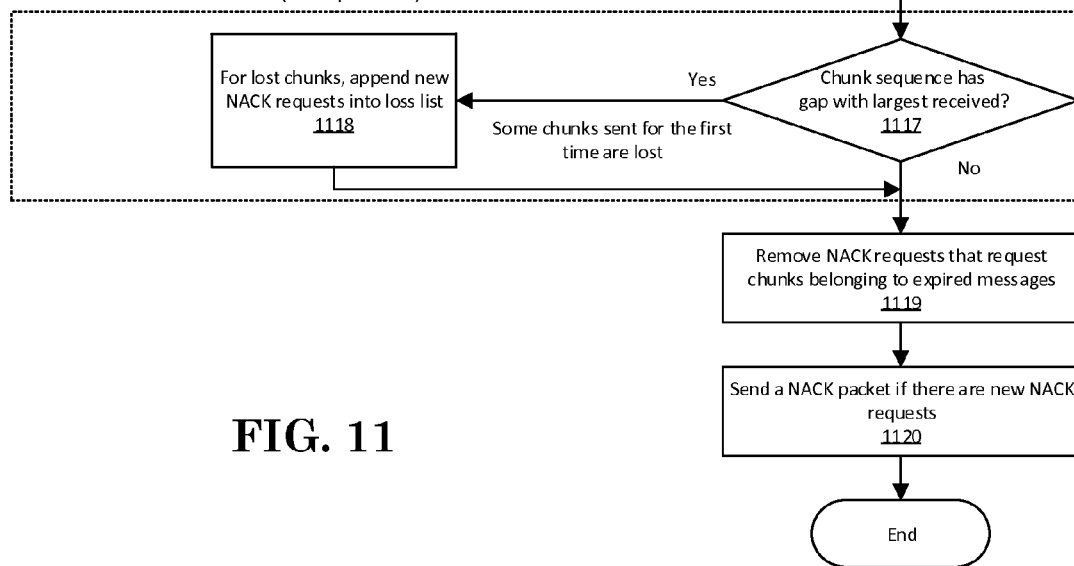

FIG. 11 provides a high-level flow diagram for the loss recovery protocol. FIG. 11 comprises two main methods: 1) Loss detection of chunks (or data packets) sent for the first time (see the steps in the lower dashed box); and 2) Loss detection of retransmitted chunks (data packets) (see steps in the upper dashed box).

At step 1110 a data packet is received. At step 1113 a test is performed to see if the NACK sequence number of the received data packet is larger than the largest NACK sequence number previously received. If not, control passes to the lower box where loss detection of chunks (data packets) is performed. At step 1117 a test is performed to see if the chunk sequence number of this packet has a gap with the largest chunk sequence number previously received. If yes, some chunks sent for the first time have been lost. At step 1118 new NACK requests corresponding to the lost chunks are appended into the loss list (list of pending NACK requests).

At step 1120 the new NACK requests are sent to the sender in a NACK packet unless at step 1119 it is detected that one or more NACK requests correspond to chunks that are part of an expired message. Such NACK requests are removed. Thus, in effect, the message dropping procedure (see above) places a limit on the efforts of the loss recovery protocol to recover lost data.

Returning to step 1113, if the received data packet does have a NACK sequence number larger than the largest NACK sequence number previously received, this indicates that some chunks have been retransmitted since the last data packet was received.

At step 1114 it is determined, based on any gap in NACK sequence numbers, whether any retransmitted chunks have been lost. If so, at step 1115 new NACK requests are appended into the loss list. At step 1115 all NACK requests prior to and including this NACK sequence number are removed from the loss list. Control then passes to box 1117 where the test for lost chunks is performed as before.

Error control will now be discussed in further detail with reference to the sequence diagram of FIG. 12.

Figure 12:
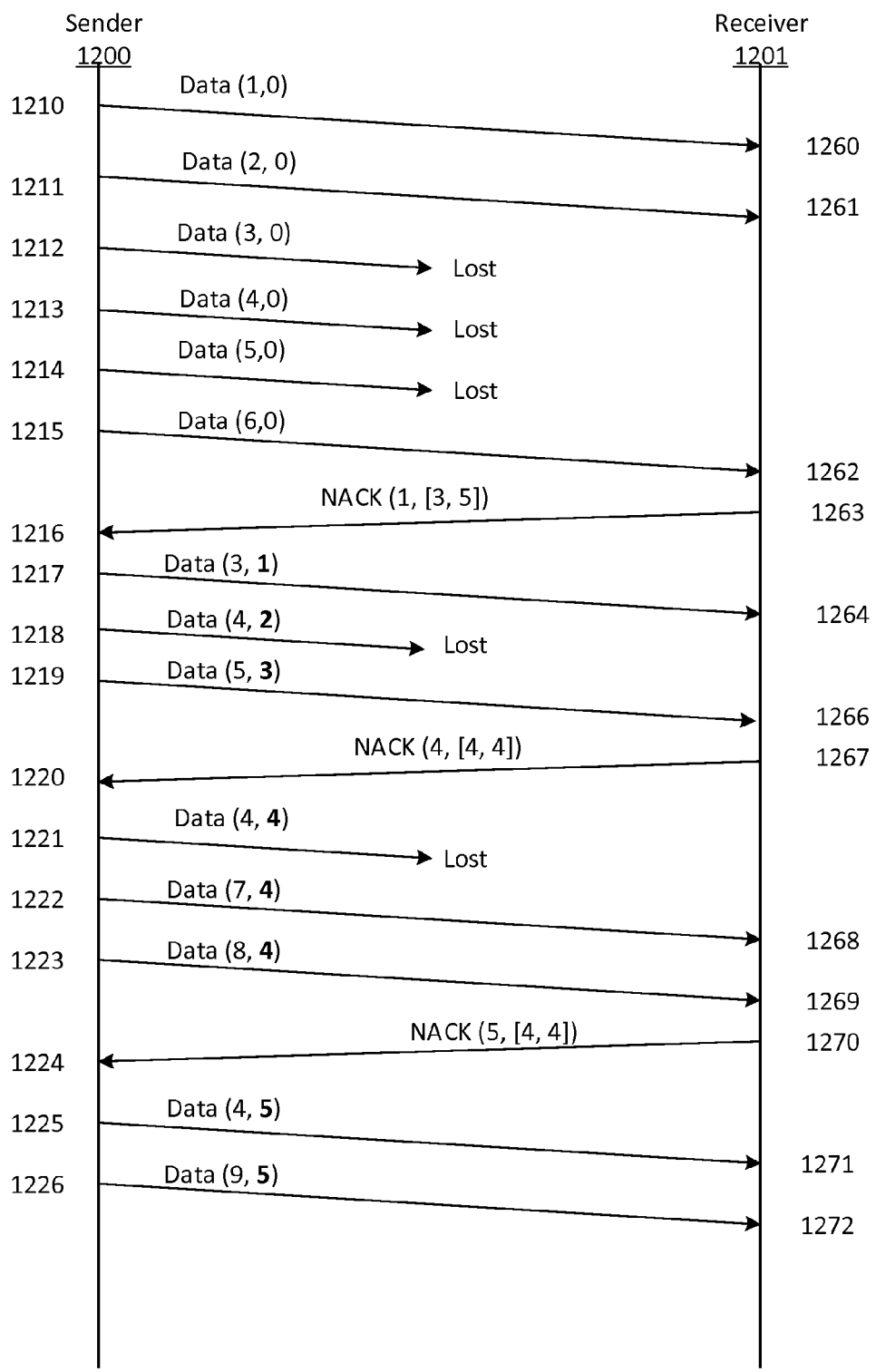
FIG. 12 is a sequence diagram for a loss recovery protocol according to an embodiment of the present invention.

FIG. 12 shows exchanges of data packets and NACK packets between a sender 1200 and a receiver 1201 in conformance with embodiments of the error control procedure of the present application. For each data packet, values for the chunk sequence number and NACK sequence number are indicated. For each NACK packet, values for the NACK sequence number and loss block (sequence number range of lost packets) are indicated.

In particular, loss detection at the receiver is demonstrated. Step 1262 is an example of the loss detection of chunks sent for the first time. Steps 1266 and 1269 illustrate loss detection of retransmitted chunks.

At steps 1210-1215 data packets having chunk sequence numbers 1, 2, 3, 4, 5, and 6 are sent. Of these, data packets 1, 2, and 6 are successfully received, but packets 3, 4, and 5 are lost. At step 1262, the receiver detects the break in chunk sequence numbers, and at step 1263 sends toward the sender a NACK packet with a NACK sequence of 1 and loss block of [3,5].

At step 1216 the sender receives the NACK packet. At steps 1217-1219 the sender resends data packets 3, 4, and 5. Resent packet 3 carries the NACK sequence number 1. The NACK sequence number is incremented for each resent packet, so that resent data packets 4 and 5 carry, respectively, NACK sequence numbers 2 and 3. Resent data packet 4 is lost, and this is detected by the receiver at step 1266 from the break in NACK sequence numbers. A new NACK with sequence number 4 and loss block [4,4] is then generated and sent to the sender.

At step 1221 data packet 4 is resent but is again lost. The loss is detected in the receiver at step 1269, which at step 1270 sends a NACK with NACK sequence 5 and loss block 4,4, which is received at sender 1200 at step 1224.

At steps 1222 and 1223 data packets 7 and 8 are successfully sent, with the NACK sequence number remaining at 4.

At step 1225 data packet 4 is again re-sent, now with NACK sequence number 5. This time data packet 4 is successfully received.

At step 1226, a data packet 9 is successfully sent, with NACK sequence remaining at 5.

As discussed above, the "loss list" is a list of pending NACK requests. Each NACK request has a unique NACK sequence number and the sequence number of a lost chunk. NACK requests are "appended" into the loss list whenever new packet loss is detected. Operation of the loss list may be understood with regard to the example of FIG. 12 as follows:

In FIG. 12, three data packets (chunks) are received at steps 1260, 1261, and 1262. The losses of chunks 3, 4, 5, are detected. Three items (1, 3), (2, 4), (3, 5) are appended into the loss list. The loss list then becomes [(1, 3), (2, 4), (3, 5)]. It can be represented more compactly by [(1, [3, 5])]

The pending NACK request(s) is (are) removed (acknowledged) from the loss list when 1) the chunks that they request are successfully received or 2) the retransmitted chunks are lost again. In this case, new NACK request(s) is (are) appended.

For example, at step 1264, the retransmitted chunk 3 that responds to NACK request 1 is received, which acknowledges the receiver that NACK request 1 has been successfully responded to and can be removed from loss list. At step 1266, NACK request 3 is also successfully responded to while NACK request 2 fails since retransmitted chunk 4 is lost. Both NACK request 2 and 3 are removed from loss list. A new NACK request (4, 4) for chunk 4 is appended to loss list.

Additional Embodiments

In one aspect, an embodiment provides for low-delay transmission of packets across a network from a transmitter to a receiver, comprising, at one or more computers coupled to the network, transmitting a data packet; at the transmitter, receiving an ACK packet conveying a congestion event rate and an echoed sequence number; at the transmitter, calculating a smoothed round-trip time based on the echoed sequence number; at the transmitter, utilizing a TCP throughput equation to calculate an allowed sending rate, based on a congestion event rate and smoothed round-trip time; at the transmitter, calculating a current queueing delay of a send buffer; at the transmitter, queueing into the send buffer a message requested to be sent by an application only if the current queueing delay does not exceed a threshold; at the transmitter, inserting a time limit value in a data packet, the time limit value signaling to the receiver a limit on how long the associated message should stay in the receive buffer before being removed; at the transmitter, inserting a message drop sequence number in a data packet, the message drop sequence number signaling to the receiver to drop all messages with an earlier sequence number; and at the transmitter, receiving a NACK packet indicating a range of sequence numbers of lost packets, and retransmitting the lost packets. Also disclosed is a computer program product stored on a non-transitory computer-readable medium that, when read and executed by one or more computers, performs the above-disclosed method. Also disclosed is a transmitter for transmitting packets across a network to a receiver with low delay, and for receiving an ACK packet conveying a congestion event rate and an echoed sequence number; calculating a smoothed round-trip time based on the echoed sequence number; utilizing a TCP throughput equation to calculate an allowed sending rate, based on a congestion event rate and smoothed round-trip time; calculating a current queueing delay in a send buffer, and queueing into the send buffer a message requested to be sent by an application only if the current queueing delay does not exceed a threshold; and receiving a NACK packet indicating a range of sequence numbers of lost packets, and retransmitting the lost packets.

In another aspect a method is disclosed for low delay reception of packets across a network from a transmitter to a receiver, comprising, at one or more computers coupled to the network: receiving a data packet; at the receiver, detecting packet losses indicative of congestion by detecting sequence number breaks; at the receiver, detecting high queueing delay indicative of congestion based on a timestamp value in a received data packet; at the receiver, calculating a congestion event rate and sending to the transmitter an ACK packet conveying the congestion event rate and an echoed sequence number, as input to the calculation of allowed sending rate; at the receiver, determining, based on a time limit value in each received data packet, the maximum allowable time for a message to stay in the receive buffer, and removing any messages that exceed the maximum allowable time; at the receiver, receiving a data packet having a message drop sequence number, and dropping all messages prior to a message associated with the data packet; and at the receiver, identifying lost packets via sequence number gaps, and, when losses are detected, sending a NACK packet to the transmitter to request the transmitter to retransmit the lost packets. Also disclosed is a computer program product stored on a non-transitory computer-readable medium that, when read and executed by one or more computers, performs the above-disclosed method. Also disclosed is a transmitter for transmitting packets across a network to a receiver with low delay, the transmitter comprising: a congestion control module configured to receive an ACK packet conveying a congestion event rate and an echoed sequence number, calculate a smoothed round-trip time based on the echoed sequence number, and utilize a TCP throughput equation to calculate an allowed sending rate based on the congestion event rate and the smoothed round-trip time; a send buffer; a queue control module configured to calculate a current queueing delay in the send buffer and to queue into the send buffer a message requested to be sent by an application only if the current queueing delay does not exceed a threshold; and an error control module configured to receive a NACK packet indicating a range of sequence numbers of lost packets, wherein the transport layer is configured to direct the transmitter to retransmit the lost packets. Also disclosed is receiver for receiving packets from a transmitter across a network with low delay, the receiver comprising: a congestion control module configured to detect congestion by detecting packet losses or high queueing delay, and to send to the transmitter an ACK packet conveying a congestion rate event and an echoed sequence number; a message dropping module configured to determine, based on a time limit value in each data packet, the maximum allowable time for a message to stay in a receive buffer, and removing any messages that exceed the allowable time, the message dropping module further configured to receive a data packet having a message drop sequence number, and to drop all messages with an earlier message sequence number from the receive buffer; and an error control module configured to identify lost packets via sequence number gaps, and, when losses are detected, send a NACK packet to the transmitter to request the transmitter to retransmit the lost packets.

Although a few exemplary embodiments have been described above, one skilled in the art will understand that many modifications and variations are possible without departing from the spirit and scope of the present invention. Accordingly, all such modifications and variations are intended to be included within the scope of the claimed invention.

What is claimed is:

1. A method for low-delay transmission of packets across a network from a transmitter to a receiver, comprising, at one or more computers coupled to the network:
   transmitting a data packet;
   at the transmitter, receiving an ACK packet conveying a congestion event rate and an echoed sequence number;
   at the transmitter, calculating a smoothed round-trip time based on the echoed sequence number;
   at the transmitter, utilizing a TCP throughput equation to calculate an allowed sending rate, based on a congestion event rate and smoothed round-trip time;
   at the transmitter, calculating a current queueing delay of a send buffer;
   at the transmitter, queueing into the send buffer a message requested to be sent by an application only if the current queueing delay does not exceed a threshold;
   at the transmitter, inserting a time limit value in a data packet, the time limit value signaling to the receiver a limit on how long the associated message should stay in the receive buffer before being removed;
   at the transmitter, inserting a message drop sequence number in a data packet, the message drop sequence number signaling to the receiver to drop all messages with an earlier message drop sequence number; and
   at the transmitter, receiving a NACK packet indicating a range of sequence numbers of lost packets, and retransmitting each such lost packet that was not part of a dropped message.

2. The method of claim 1, wherein the network is the Internet.

3. The method of claim 1, wherein the method is implemented as an application-level transport protocol that operates over UDP.

4. The method of claim 1, wherein the congestion control steps, "receiving an ACK packet," "calculating a smoothed round-trip time," and "utilizing a TCP throughput equation" are implemented in substantial conformance with dflow-02.

5. The method of claim 1, wherein the TCP throughput equation is the TCP throughput equation specified in RFC 5348, section 3.1.

6. The method of claim 1, wherein, if a message is not queued into the send buffer due to excessive queueing delay, the application is explicitly notified to send the message again by a callback.

7. The method of claim 1, wherein, if a message is not queued into the send buffer due to excessive queueing delay, the application is configured to send the message again.

8. A method for low delay reception of packets across a network from a transmitter to a receiver, comprising, at one or more computers coupled to the network:
   receiving a data packet;
   at the receiver, detecting packet losses indicative of congestion by detecting sequence number breaks;
   at the receiver, detecting high queueing delay indicative of congestion based on a timestamp value in a received data packet;
   at the receiver, calculating a congestion event rate and sending to the transmitter an ACK packet conveying the congestion event rate and an echoed sequence number, as input to the calculation of allowed sending rate;
   at the receiver, determining, based on a time limit value in each received data packet, the maximum allowable time for a message to stay in a receive buffer, and removing any messages that exceed the maximum allowable time;
   at the receiver, receiving a data packet having a message drop sequence number, and dropping all messages prior to a message associated with the data packet; and
   at the receiver, identifying lost packets via sequence number gaps, and, when losses are detected, sending a NACK packet to the transmitter to request the transmitter to retransmit the lost packets.

9. The method of claim 8, wherein the network is the Internet.

10. The method of claim 8, wherein the method is implemented as an application-level transport protocol that operates over UDP.

11. The method of claim 8, wherein the congestion control steps "detecting packet losses," "detecting high queueing delay," and "calculating a congestion event rate" are implemented in substantial conformance with dflow-02.

12. The method of claim 8, further comprising sending a request out-of-band from the receiver to a video encoder to request that a key frame be sent in place of a dropped key frame.

13. The method of claim 12, wherein the request to the video encoder is sent via a TCP connection.

14. The method of claim 8, wherein the congestion event rate is the inverse of a weighted average of recent congestion intervals.

15. A computer program product in a non-transitory computer-readable medium comprising instructions executable by a computer processor to transmit data packets across a network from a transmitter to a receiver with low delay by:
   transmitting a data packet;
   at the transmitter, receiving an ACK packet conveying a congestion event rate and an echoed sequence number;
   at the transmitter, calculating a smoothed round-trip time based on the echoed sequence number;
   at the transmitter, utilizing a TCP throughput equation to calculate an allowed sending rate, based on a congestion event rate and smoothed round-trip time;
   at the transmitter, calculating a current queueing delay of a send buffer;
   at the transmitter, queueing into the send buffer a message requested to be sent by an application only if the current queueing delay does not exceed a threshold;

at the transmitter, inserting a time limit value in a data packet, the time limit value signaling to the receiver a limit on how long the associated message should stay in the receive buffer before being removed;

at the transmitter, inserting a message drop sequence number in a data packet, the message drop sequence number signaling to the receiver to drop all messages with an earlier message drop sequence number; and at the transmitter, receiving a NACK packet indicating a range of sequence numbers of lost packets, and retransmitting each such lost packet that was not part of a dropped message.

16. The computer program product of claim 15, wherein the instructions further comprise instructions for, at the transmitter, receiving a key frame request and, upon receiving the key frame request, responding by sending a new key frame.

17. A computer program product in a non-transitory computer-readable medium comprising instructions executable by a computer processor to receive data packets across a network from a transmitter at a receiver with low delay by:

receiving a data packet;

at the receiver, detecting packet losses indicative of congestion by detecting sequence number breaks;

at the receiver, detecting high queueing delay indicative of congestion based on a timestamp value in a received data packet;

at the receiver, calculating a congestion event rate and sending to the transmitter an ACK packet conveying the congestion event rate and an echoed sequence number, as input to the calculation of allowed sending rate;

at the receiver, determining, based on a time limit value in each received data packet, the maximum allowable time for a message to stay in a receive buffer, and removing any messages that exceed the maximum allowable time;

at the receiver, receiving a data packet having a message drop sequence number, and dropping all messages prior to a message associated with the data packet; and at the receiver, identifying lost packets via sequence number gaps, and, when losses are detected, sending a NACK packet to the transmitter to request the transmitter to retransmit the lost packets.

18. The computer program product of claim 17, wherein the instructions further comprise instructions for, at the receiver, requesting transmission of a new key frame when one or more video frames are dropped in the receiver.

* * * * *